Figure 1:
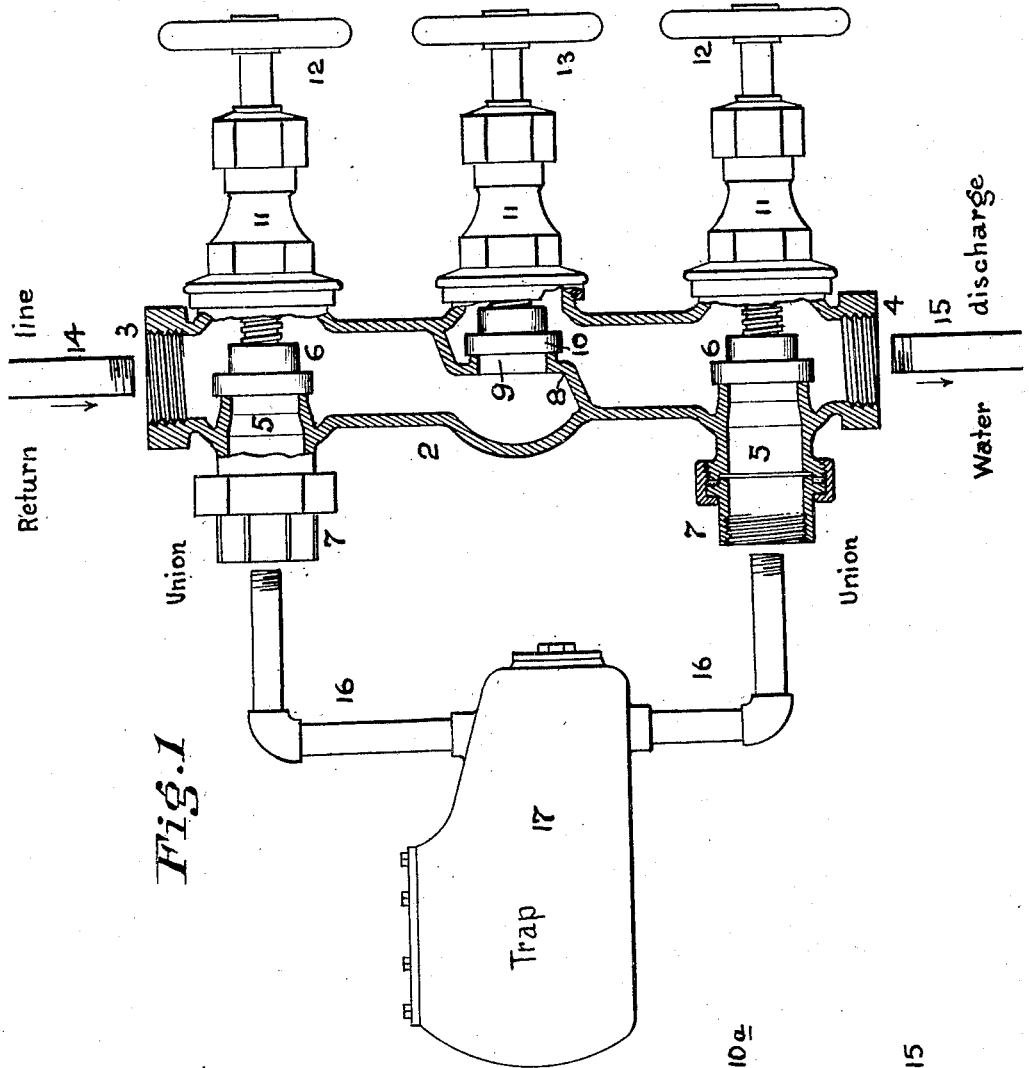

F. H. SCHAEFER.
BY-PASS VALVE.
APPLICATION FILED JULY 8, 1921.

1,417,770.　　　　　　　　　　　　　Patented May 30, 1922.

Inventor
FRANK H. SCHAEFER.
By
ATTORNEY.

UNITED STATES PATENT OFFICE.

FRANK H. SCHAEFER, OF CAMDEN, NEW JERSEY.

BY-PASS VALVE.

1,417,770.

Specification of Letters Patent.  Patented May 30, 1922.

Application filed July 8, 1921. Serial No. 483,174.

*To all whom it may concern:*

Be it known that I, FRANK H. SCHAEFER, a citizen of the United States, and resident of Camden, county of Camden, State of New Jersey, have invented an Improvement in By-Pass Valves, of which the following is a specification.

The object of my invention is to provide a suitable by-pass valve device adapted for general use in pipe lines wherever a means, such as a trap or other article is to be normally in operative relation with the steam or heating system but capable of being put out of operative relation by the provision of a by-pass about it whenever the said trap or other article may be required to be opened for inspection or removed for repairs or other purposes.

Heretofore, in steam systems, whether for power or for steam heating, it was customary to provide steam traps which permitted the escape of water of condensation and prevented the escape of steam, and in such uses, it was common practice to provide a by-pass connection, between the steam or return main to the discharge pipe, with hand valve in the by-pass as well as in the branch pipes leading to and from the steam trap; and, moreover, it was customary to provide unions in the branch pipe between the hand valves and the trap, whereby the trap may be disconnected, when desired. In such practice, the great number of fittings, valves and pipe sections required are objectionable and costly, not only from the initial cost and the accuracy necessary in obtaining the proper lengths of the pipe sections and nipples, but also in the great consumption of time of the steam fitter in assembling the parts. Furthermore, the use of such fittings requires considerable skill on the part of the pipe fitter to make a satisfactory job, and, moreover, the piping, valves, etc., occupy very considerable space and this is not always available where the trap is required to be located.

More specifically, the object of my invention is, therefore, to overcome all of the objections above specially recited inherent to the common practice of installing a trap or similar articles with a by-pass about it, and this I accomplish by an organized device embodying the necessary valves, by-pass and fittings closely coupled, which is not only far more economical in its initial coat, but eliminates numerous joints and separate parts which have been heretofore necessary, and furthermore, by the parts being closely condensed, the entire space occupied for connection of the trap and its by-pass is relatively small, whereby the invention lends itself to uses where available space is restricted.

With the above and other objects in view, the nature of which will be more fully understood from the description hereinafter, the invention consists in the novel construction of a by-pass valve, as hereinafter more fully described and defined in the claims.

Referring to the drawings: Fig. 1 is a sectional view through my improved by-pass valve device, and also shows the relation of the pipe and trap portions with which my improved valve device is to be associated in actual practice; and Fig. 2 is an elevation illustrating the common practice in use for connecting a steam trap in a pipe line in association with a by-pass pipe about the trap.

Figure 2:
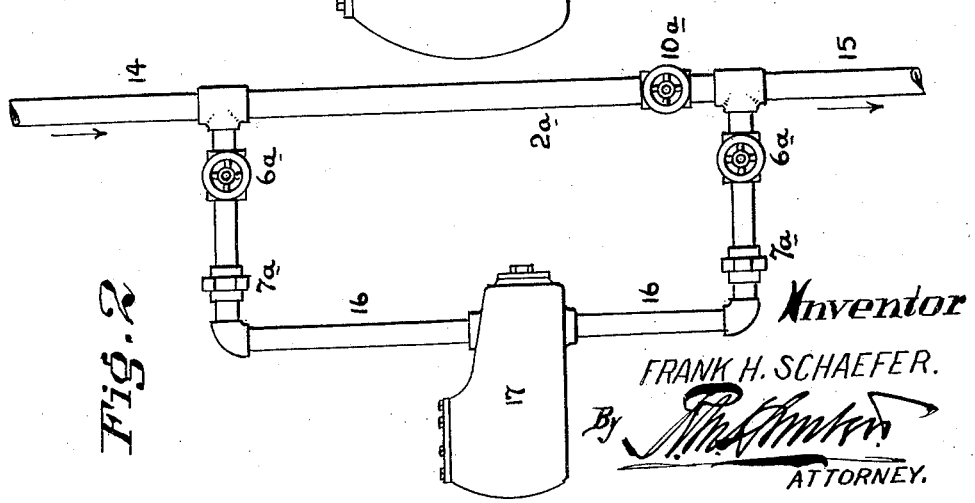

First referring to the illustration of Fig. 2 which is characteristic of the common practice heretofore in use, 14 is a pipe leading from the steam mains or returns of a heating or other system, and 15 is the discharge pipe leading to any place desired, according to whether the water is to be delivered to the sewer or to be returned to the boiler for further use. $2^a$ is the by-pass pipe between the pipes 14 and 15 and is provided with a hand valve $10^a$. Branching from the juncture of the pipes 14 and $2^a$ and also from the juncture of the pipes 15 and $2^a$ are L shaped pipe connections 16 respectively leading to and from the trap 17. Each of these pipes leading to and from the trap is provided with a hand valve $6^a$ and, furthermore, these pipes between the hand valves and the trap 17 are provided with unions $7^a$. It is manifest that by closing the valve $10^a$ and opening the valve $6^a$, the water of condensation passes from pipe 14 to the trap 17 and then is delivered by the trap to the pipe 15. If for any reason the trap is to be opened or removed for repairs, the valves $6^a$ are closed and valve $10^a$ is opened, or otherwise controlled to regulate the flow through the by-pass pipe $2^a$. When this is done, the trap may be opened for inspection or may be uncoupled from the system by means of the unions $7^a$. By a mere inspection of this drawing, Fig. 2, it will be seen that there are ten pieces of pipe, three complete valves, two unions, two elbows and two T fittings, making in all nineteen separate parts. By my invention, all of these parts are eliminated excepting four pieces of pipe and two (2) elbows with the substitution of a single unitary organized by-pass valve device.

I will now describe the details of my improved valve device. 2 is a tubular body portion open from one end to the other except at the middle and provided at opposite ends with screw threaded parts 3 and 4 respectively adapted for direct connection with the pipes 14 and 15 of the general steam or heating system. The thoroughfare of the body 2 is provided with a transverse diaphragm 8 having a port 9 therethrough, said port being controlled by a by-pass valve 10 which, when open, permits free passage from the port end 3 to the port end 4, and hence communication from the pipe 14 to the pipe 15. The body 2 is further provided with lateral outlet ports 5, 5, respectively on opposite sides of the diaphragm 8, and these ports are each controlled by a valve 6 arranged within the thoroughfare. The outlet ports 5, 5, are respectively provided with unions 7, that is to say, the union is partly of the body structure and hence is an organized part of the device as a whole. The several valves are operated by suitable valve stems extending through bonnets and stuffing boxes, indicated at 11, of any ordinary construction and fitted at their outer ends with hand wheels, wheel 13 being adapted to operate the by-pass valve 10 and wheels 12, 12, adapted to respectively operate the respective valves 6, 6. When the valve structure thus described is in normal use, it is coupled with the trap 17 by means of the pipe sections 16, 16, which latter respectively connect with the outer ends of the unions 7, 7.

It will now be understood that if the valve 10 is closed and the valves 6, 6, are opened, the water of condensation will pass from the pipe 14 into the upper part of the thoroughfare of the body 2, thence laterally through the upper port 5, coupling 7, and by pipe 16 into the trap 17. Under the control of the trap, the water is delivered to the lower pipe 16, thence through the lower union and port 5 into the lower part of the thoroughfare of the body, and thence into the discharge pipe 15. If, for any reason, the trap is to be opened, the valves 6, 6, are closed and the by-pass valve 10 opened and thereupon the contents from the pipe 14 may pass through the thoroughfare of the body 2 directly to the pipe 15, and during this time the thoroughfare may be controlled as to freeness of the passage by adjusting the valve 10. Should it be desired to remove the trap to take it to the shop for repairs or to enable replacement, the unions 7, 7, are separated so that the trap and pipes 16 may be disconnected from the body part 2.

It will be understood that the several valves 6, 10, 6, of the organized valve device may be associated as closely together as convenient handling of the hand wheels will permit, but preferably, with sufficient separation that the pipe fittings constituting the L shaped pipe portions 16 may be properly made, but I do not restrict myself as to the exact proportions or shapes to be given to the body and its associated parts as these may be varied to suit the requirements of commercial practice. Furthermore, while it is desirable that valve pieces of the cold valve type are desirable, my invention broadly considered may embody control valves of any suitable character provided that they are arranged in the organized apparatus for combining a by-pass port between the two ends of the thoroughfare and for controlling the ports in the two portions of the thoroughfare leading to the ports 5, 5.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. An organized by-pass valve device comprising a body part having a thoroughfare provided at one end with an inlet port and at the other end with an outlet port, and further having the body divided intermediate of its ends by a transverse diaphragm having a by-pass port, said body also having two independent lateral ports one on each side of the by-pass port and respectively opening into the thoroughfare between the by-pass port and the inlet and outlet ports, in communication with a by-pass valve adjustably carried by the body for controlling the by-pass port, and two independent operating valve means also carried by the body and respectively arranged to control the lateral ports to open both lateral ports when the by-pass port is closed.

2. The invention according to claim 1, wherein further the lateral outlet ports are provided with pipe unions, a portion of which unions are integral with the body of the by-pass valve device.

3. The invention according to claim 1, wherein the body part is provided with lateral openings in axial alinement with the by-pass port and the two lateral ports and by-pass valve and valve means, said lateral openings respectively provided with bonnets removably attached to the said body and acting as closures over the lateral openings and supports for the valves.

4. An organized by-pass valve device, comprising a body having a thoroughfare normally divided into two chambers, said chambers being each provided with two separate ports which are out of direct communication, combined with a by-pass valve for controlling communication between the two chambers whereby they may be put into communication or kept separated, as required, and an independently operable valve means for each of the chambers for respectively controlling one of the separate ports of each of said chambers, the remaining port of each of said chambers being provided with means for attachment to piping.

5. The invention according to claim 4, wherein the body is further provided with a union arranged upon each of the two ports controlled by the valve means of the respective chambers.

In testimony of which invention, I hereunto set my hand.

FRANK H. SCHAEFER.